No. 617,685.  
J. M. GILBERT.  
ATTACHMENT FOR BICYCLES.  
(Application filed Oct. 5, 1897.)  
Patented Jan. 10, 1899.
(No Model.)
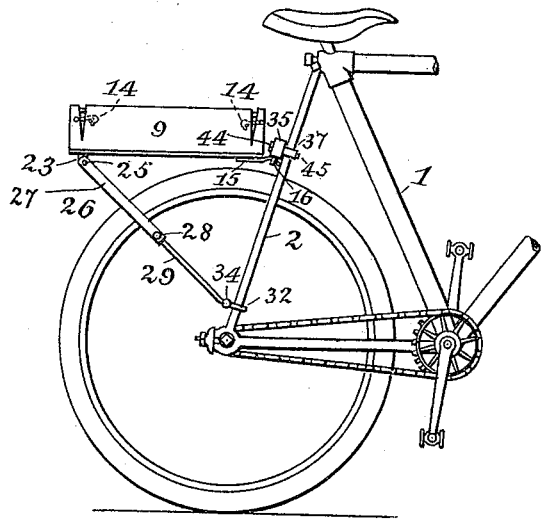
Fig. 1.
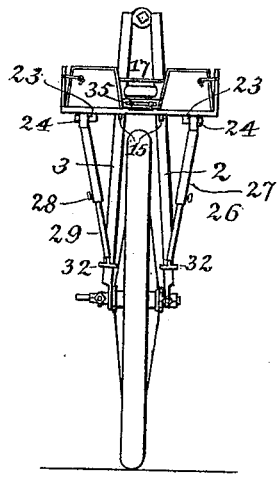
Fig. 2.
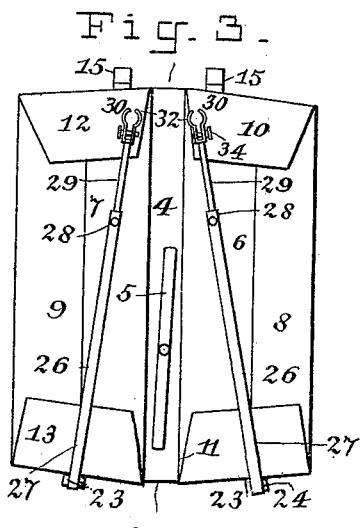
Fig. 3.
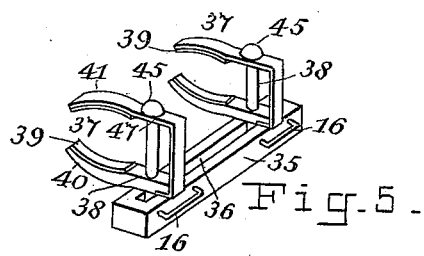
Fig. 4.
Fig. 5.
Fig. 6.
Fig. 7.
Witnesses:
E. B. Bolton
E. F. Ryan
Inventor:
Joel M. Gilbert
By Charles L. Rogers
his Attorney.
THE NORRIS PETERS CO., PHOTO-LITHO., WASHINGTON, D. C.

UNITED STATES PATENT OFFICE.

JOEL M. GILBERT, OF CLINTON, CONNECTICUT.

ATTACHMENT FOR BICYCLES.

SPECIFICATION forming part of Letters Patent No. 617,685, dated January 10, 1899.

Application filed October 5, 1897. Serial No. 654,099. (No model.)

*To all whom it may concern:*

Be it known that I, JOEL M. GILBERT, a citizen of the United States, residing at Clinton, in the county of Middlesex and State of Connecticut, have invented certain new and useful Improvements in Attachments for Bicycles; and I do hereby declare the following to be a full, clear, and exact description of the invention, such as will enable others skilled in the art to which it appertains to make and use the same.

This invention relates to attachments for bicycles and other vehicles, and particularly to attachments for carrying articles or baggage; and some of the objects of the invention are to provide a simple, cheap, and effective attachment of this character which can be readily and quickly attached to or detached from the bicycle or other vehicle and when not in use may be folded together and, if desired, suspended from the upper main tube of the bicycle or carried in any other preferred manner, and also to provide an improved clamping attachment adapted to be adjusted so as to engage one or more tubes of the bicycle-frame and to remain normally in position thereon, although being readily detachable therefrom, said clamping attachment being provided with means for receiving the connecting portions of the carrying attachment, so that the latter may be readily and quickly connected with and disconnected from the clamping attachment, and to provide longitudinally-adjustable supports carrying clamps; and with these and other objects in view this invention consists in the construction, combination, and arrangement of parts, substantially as hereinafter more fully described in the following specification and illustrated in the accompanying drawings, in which—

Figure 1 is a side elevation of a portion of a bicycle provided with my improvements. Fig. 2 is an end elevation of the same. Fig. 3 is a top plan view of the attachment partially folded. Fig. 4 is an end elevation of a modified form of construction. Fig. 5 is a perspective view of my improved clamping attachment. Fig. 6 illustrates a form of clamp; and Fig. 7 is an end view of the construction shown in Fig. 5, illustrating the hooks of the attachment in engagement therewith.

Similar characters of reference designate like parts throughout the several views.

Referring to the drawings, and particularly to Figs. 1 and 2 thereof, the reference character 1 designates the diagonal or down tube of an ordinary bicycle-frame, and 2 and 3 the rear forks, respectively, and in these figures I have only illustrated a portion of the frame of an ordinary bicycle in order to exemplify my invention; but I do not desire to confine my invention to use in connection with bicycles, for it may be employed in connection with other vehicles.

The carrier portion of my attachment consists, essentially, of a central strip 4, to the upper side of which is pivoted a bar 5, and to each side of the strip 4 are hinged or otherwise connected plates 6 and 7, provided with folding sides 8 and 9 and folding ends 10 11 and 12 13, respectively, and these sides and ends may carry hooks and eyes or staples 14 or any other means for detachably connecting the same and retaining them in a vertical position, and, if desired, the sides and ends may be connected with the plates 6 and 7 by interposed flexible material, or they may be constructed of flexible material having sufficient stiffness or in any other manner that may be found desirable in practice.

The edges of the ends and sides are preferably cut obliquely or inclined, as shown in Figs. 1 and 3, in order that they may be readily folded; but this feature may be changed if found desirable.

Secured to one end of the plates 6 and 7 in any desired manner are sheet-metal or other hooks 15, adapted to detachably engage the staples or other devices 16 of the clamping attachment and support the forward end of the plates, and by means of this construction it will be seen that the parts can be readily and quickly connected and disconnected.

I do not confine myself to any particular material from which to construct the carrier portion of my attachment, as wood, papier-mâché, or any other suitable substance may be employed, and, if desired, the same may be coated with rubber or other waterproof material.

The carrier portion of my attachment may be constructed of a light skeleton frame, substantially as shown in Fig. 4 of the drawings, consisting of a central strip 18, to which are hinged plates 19 and 20, the latter being provided upon their exterior edges with skeleton sides and ends 21, constructed of rigidly or pivotally connected members 22, the ends and sides being adapted to fold inwardly upon the plates 6 and 7, as before described, and, if preferred, the strip and plates may also be skeleton or frame like, or the attachment may consist of a tray or box with rigid parts.

Secured to or connected with the rear ends of the plates 6 and 7 are projections or lugs 23, the free ends of which are bent at right angles and are provided with screw-threads adapted to receive securing-nuts 24, and detachably mounted upon these projections 23 by means of an eye 25 are the supports 26, consisting of a tubular upper portion 27, pivotally mounted on said projections and provided with set-screws 28 near the free ends thereof, and the lower rod-like portions adapted to slide within the tubular upper portions and be retained at any desired position therein by means of the set-screw 28, and the free ends of the lower portions of the supports 29 are provided with clamps 30, Figs. 1, 3, and 6, adapted to detachably engage the rear forks or the other tubes of a bicycle-frame or parts of any vehicle to which the attachment may be connected. These clamps 30 consist of a yoke 31, provided with outwardly-directed curved arms 32, the edges of which are bent inwardly to impinge against and retain a facing 33, of rubber, cork, or other suitable material, to prevent injury to the part upon which the clamp is secured, and the yoke 31 carries a tightening-screw 34 for forcing the arms 32 of the yoke toward each other, and the yoke 31 is preferably made of spring metal, so that the arms 32 will normally tend to spring outwardly, and it will be understood that the opening in the arm 32 adjacent to the head of the screw 34 is elliptical in form to allow for the movement of said arm when tightening the screw. The shank of the yoke 31 is swiveled in the extremity of the support 29, as shown, and the free movement of the clamp is thus effected.

My improved clamping attachment consists, substantially, of a main portion or base 35, of any desired material, in which is formed a longitudinal slot 36, extending nearly the entire length thereof, and adjustably mounted upon the base 35 are two or more clamps 37, formed of a lower rigid jaw 40, having a curved clamping end, preferably faced with soft material 39, such as rubber or cork, and provided with a hole in the opposite end thereof, and let into or countersunk in the rear end of the jaw 40 is the fixed end of the movable spring-jaw 41, also having a curved clamping end provided with a soft facing, as before described, and through the elliptical hole in the spring-jaw 41 and the hole in the rigid jaw 40 passes a binding or clamping pin 45, the extremity of which passes through the slot 36 in the base 35 and is provided with a nut 44, by means of which the position of the clamps 37 upon the base 35 can be adjusted as desired as well as the tension of the clamps can be regulated. By means of this construction a clamping attachment is produced which will engage both of the rear forks of a bicycle and can be readily adjusted to any position thereon or which can be applied to any of the tubes of a bicycle irrespective of the design or make of the same.

When it is desired to place the attachment in position upon a bicycle, the clamping attachment is first secured upon the rear fork, as shown in Fig. 1. Then the hooks 15 are inserted within the staples 16 on said clamping attachment, and the clamps 30, carried by the supports 29, are secured to the rear forks, and the supports are adjusted to the desired length and secured in that position, and to remove the attachment from the bicycle it is only necessary to loosen the clamps 30 from the rear fork and disengage the hooks 15, when the attachment may be folded and suspended from the upper main tube by straps or other means provided for that purpose.

I do not desire to confine myself to the specific construction herein shown and described, and I therefore reserve the right to make all such changes in and modifications of the same as come within the spirit and scope of my invention.

Having accurately described my invention, what I claim as new, and desire to secure by Letters Patent, is—

1. An attachment for bicycles provided with a carrier, having a bottom of interhinged members adapted to fold upon a central longitudinal bottom member, so that the bottom members lie in different planes, and means for detachably connecting the front and rear of the same with a bicycle.

2. An attachment for bicycles provided with a carrier, having a bottom of interhinged members adapted to fold upon a central longitudinal bottom member, so that the bottom members lie in different planes and means carried by said central member for retaining the same in an open position.

3. An attachment for bicycles provided with a carrier having a bottom of interhinged members adapted to fold upon a central bottom member, so that the bottom members lie in different planes and a bar pivoted to said member to prevent the folding of the parts.

4. An attachment for bicycles provided with a carrier, composed of interhinged bottom members adapted to fold upon a central longitudinal bottom member, so as to lie in different planes and means carried by said central member for retaining the members in an open position.

5. An attachment for bicycles provided with a carrier composed of interhinged bottom members adapted to fold together so as to lie in different planes having movable connection with a central bottom member, means pivoted to said central bottom member for retaining said members in an open position and for connecting the attachment with a bicycle.

6. An attachment for bicycles provided with a carrier having a bottom of interhinged members and sides and ends adapted to fold upon said members and means for retaining the parts in an open position.

7. An attachment for bicycles provided with a carrier having a bottom composed of a plurality of members hinged to a central member to fold upon the same, sides and ends carried by the outside members adapted to fold thereupon, engaging devices upon the bottom members to detachably engage with a support upon the bicycle and means for supporting the rear of the carrier.

8. An attachment for bicycles provided with a carrier having a bottom composed of a plurality of members hinged to a central member to fold upon the same, sides and ends carried by the outside members adapted to fold thereupon, means for supporting the front of the carrier and adjustable supports upon the rear thereof.

9. An attachment for bicycles consisting of a longitudinally-foldable main portion adapted to fold into different planes provided with hooks at the forward end thereof to engage a support upon the bicycle, and longitudinally-adjustable supports pivotally connected with the rear of said main portion and carrying pivotally-connected clamps to detachably engage the tubes of the bicycle-frame.

10. A clamping attachment consisting of a base provided with a longitudinal slot and a plurality of complete clamping-jaws upon said base and adjustable thereon.

11. A clamping attachment consisting of a longitudinally-slotted base, a plurality of complete clamping-jaws adjustably mounted thereon and tightening-pins passing through said jaws and slot to secure the attachment in position.

12. A clamping attachment provided with a base having an oblong slot, adapted to receive a tension-pin carried by clamping-jaws adjustably mounted on one face of said base, said jaws being mounted in a plane at right angles to the base, whereby when said jaws are tightened their position on said base is fixed.

13. The combination with a bicycle of a slotted base carrying adjustable jaws adapted to engage the rear fork and having loops or staples, a carrier adapted to fold upon a central member, hooks upon the forward end of said carrier to detachably engage said loops or staples and adjustable supports for the rear of said carrier having clamps to engage the lower portions of said fork.

In testimony whereof I affix my signature in presence of two witnesses.

JOEL M. GILBERT.

Witnesses:
CHARLES S. ROGERS,
E. F. RYAN.